(12) United States Patent
Neumann et al.

(10) Patent No.: US 9,458,866 B2
(45) Date of Patent: Oct. 4, 2016

(54) STRUCTURAL ELEMENT FOR AN AIRCRAFT AND/OR SPACECRAFT AND METHOD FOR PRODUCING SUCH A STRUCTURAL ELEMENT

(71) Applicant: AIRBUS OPERATIONS GMBH, Hamburg (DE)

(72) Inventors: Gerrit Neumann, Stade (DE); Pierre C. Zahlen, Stade (DE); Artur Poniatowski, Hamburg (DE); Benjamin Teich, Stade (DE); Ali Yildiz, Stade (DE)

(73) Assignee: Airbus Operations GmbH, Hamburg (DE)

( * ) Notice: Subject to any disclaimer, the term of this patent is extended or adjusted under 35 U.S.C. 154(b) by 256 days.

(21) Appl. No.: 13/888,512

(22) Filed: May 7, 2013

(65) Prior Publication Data

US 2013/0343805 A1 Dec. 26, 2013

Related U.S. Application Data

(63) Continuation of application No. PCT/EP2011/069650, filed on Nov. 8, 2011.

(60) Provisional application No. 61/413,197, filed on Nov. 12, 2010.

(30) Foreign Application Priority Data

Nov. 12, 2010 (DE) .................. 10 2010 043 850

(51) Int. Cl.
*B64C 1/00* (2006.01)
*F16B 1/00* (2006.01)
(Continued)

(52) U.S. Cl.
CPC . *F16B 1/00* (2013.01); *B64C 1/00* (2013.01); *B64C 3/20* (2013.01); *B64C 27/473* (2013.01); *Y10T 403/21* (2015.01)

(58) Field of Classification Search
CPC ............. B64C 1/00; B64C 3/20; F16B 1/00; Y10T 403/21
USPC ........ 52/84; 156/228, 245; 244/118.5, 118.6, 244/119, 120, 130
See application file for complete search history.

(56) References Cited

U.S. PATENT DOCUMENTS 4,213,739 A 7/1980 Euler et al.
4,298,417 A 11/1981 Euler et al.
(Continued)

FOREIGN PATENT DOCUMENTS

FR 2381662 9/1978

OTHER PUBLICATIONS

International Search Report for PCT Application Serial No. PCT/EP2011/069650 dated Feb. 23, 2012.
(Continued)

*Primary Examiner* — James Buckle, Jr.
(74) *Attorney, Agent, or Firm* — Jenkins, Wilson, Taylor & Hunt, P.A.

(57) ABSTRACT

The present invention provides a structural element for an aircraft and spacecraft, having a core which includes core regions which are uncoupled from one another by means of an expansion joint arranged between the core regions. The present invention further provides a method for producing a structural element for an aircraft or spacecraft, including the following method steps: providing a core of the structural element, which core includes core regions; and arranging an expansion joint between the core regions. The present invention relates still further to an aircraft and/or spacecraft having such a structural element.

15 Claims, 10 Drawing Sheets

(51) Int. Cl.
   *B64C 3/20*   (2006.01)
   *B64C 27/473*   (2006.01)

(56) References Cited

U.S. PATENT DOCUMENTS

| | | | |
|---|---|---|---|
| 4,302,155 A | | 11/1981 | Grimes et al. |
| 6,655,633 B1 * | | 12/2003 | Chapman, Jr. ............. 244/123.9 |
| 7,954,763 B2 * | | 6/2011 | Kulesha ..................... 244/123.1 |
| 8,012,299 B2 * | | 9/2011 | Hancock ...................... 156/292 |
| 8,490,362 B2 * | | 7/2013 | Kulesha .......................... 52/636 |
| 8,677,717 B2 * | | 3/2014 | Kulesha .......................... 52/636 |
| 2002/0170265 A1 * | | 11/2002 | Tokonabe et al. ........... 52/793.1 |
| 2003/0173460 A1 * | | 9/2003 | Chapman, Jr. ................ 244/123 |
| 2004/0079838 A1 * | | 4/2004 | Simpson et al. .............. 244/123 |
| 2012/0273617 A1 * | | 11/2012 | Jensen ....................... 244/123.1 |

OTHER PUBLICATIONS

German Office Action for Application No. 10 2010 043 850.2 dated Mar. 3, 2014.

* cited by examiner

STRUCTURAL ELEMENT FOR AN AIRCRAFT AND/OR SPACECRAFT AND METHOD FOR PRODUCING SUCH A STRUCTURAL ELEMENT

CROSS-REFERENCES TO RELATED APPLICATIONS

This application is a continuation of and claims priority to PCT/EP2011/069650 filed Nov. 8, 2011 which claims the benefit of and priority to U.S. Provisional Application No. 61/413,197, filed Nov. 12, 2010, and of the German patent application No. 10 2010 043 850.2, filed Nov. 12, 2010, the entire disclosures of which are incorporated herein by reference.

FIELD OF THE INVENTION

The present invention relates to a structural element for an aircraft and/or spacecraft, a method for producing such a structural element and an aircraft and/or spacecraft comprising such a structural element.

Although applicable to any aircraft and/or spacecraft, the present invention will be described in detail by way of example with reference to an aircraft.

BACKGROUND OF THE INVENTION

So-called sandwich components are increasingly being used as structural elements in aircraft production. In this case, a core is covered with a fibre material which is impregnated with a matrix material and thus connected to the core. For example, a foam is used as a core material, it being possible to provide the core with additional reinforcements in order to increase the rigidity. In the case of reinforced cores in particular, thermally induced crack formation can occur in the core during the production process of the sandwich component, which is exposed to an increased temperature in order to harden the matrix material. In this case, there is the risk that, once formed, a crack will spread through the entire core and thus weaken the structure of the sandwich component considerably. The presence and also the development of an incipient crack in the core can only be detected with difficulty. This is made more difficult by the fact that the crack development is a time-driven process, in other words, the structural-mechanical properties of a sandwich component having an incipient crack in the core of the component may deteriorate considerably and unpredictably over time. This may result in damage to or even disintegration of the structural element formed as a sandwich component. This is obviously to be avoided.

SUMMARY

It is therefore one idea of the present invention to provide an improved structural element for an aircraft and spacecraft.

Accordingly, a structural element for an aircraft and/or spacecraft is provided with a core having core regions which are uncoupled from one another by means of an expansion joint arranged between the core regions.

Furthermore, a method is provided for producing a structural element for an aircraft and/or spacecraft, comprising the following method steps: providing a core of the structural element, which core comprises core regions; and arranging the expansion joint between the core regions.

The idea underlying the present invention consists in providing individual core regions of the core, which core regions are uncoupled from one another by means of the expansion joint. As a result, stresses, in particular thermally induced tensile stresses, or incipient cracks occurring in a core region are reliably prevented from being transmitted to an adjacent core region. As a result, expansion of the core regions is possible without expansion-induced cracks being caused and damage already present in a core region is also reliably prevented from spreading to the entire core.

Advantageous configurations and developments of the present invention emerge from the dependent claims and from the description viewed in conjunction with the figures of the drawings.

According to a preferred development of the structural element, the expansion joint is formed in such a way that damage occurring in a corresponding core region is limited to the corresponding core region by means of the expansion joint. As a result, it is reliably ensured, for example in the case of stone impact, that only the corresponding core region is damaged and adjacent core regions remain undamaged.

According to another preferred development of the structural element, the expansion joint is formed in such a way that propagation of damage present in a corresponding core region to further core regions is inhibited. As a result, damage limitation is reliably achieved because, for example, a crack present in a core region cannot spread into the further core regions. Time-driven damage to the further core regions is reliably prevented.

According to another preferred development of the structural element, the structural element has a sandwich structure comprising a cover layer which surrounds the core at least in portions, in particular a cover layer comprising carbon fibres. The cover layer advantageously makes it possible to achieve a high level of rigidity and the desired mechanical properties of the structural element. It also advantageously allows loads to be introduced into the structural element.

According to another preferred development of the structural element, the expansion joint is connected, in particular bonded, to the cover layer. As a result, a movement of the expansion joint in the core is reliably inhibited.

According to another preferred development of the structural element, the core comprises an integrated reinforcement. Consequently, the rigidity of the core can be adjusted exactly by means of the integrated reinforcement and adapted to requirements.

According to another preferred development of the structural element, the integrated reinforcement couples together opposing cover skins of the cover layer of the structural element, the integrated reinforcement and the cover layer being formed in particular monolithically. As a result, the rigidity of the structural element is increased in portions, whereby the mechanical properties of the structural element can advantageously be adjusted. The monolithic connection between the integrated reinforcement and the cover layer allows optimal force transmission from the reinforcement to the cover layer and vice versa.

According to another preferred development of the structural element, the integrated reinforcement comprises a plurality of reinforcement pins or reinforcement needles and/or reinforcement profiles, whereby either linear or planar reinforcement of the core is advantageously provided.

According to another preferred development of the structural element, the core comprises a foam material, whereby the structural element can advantageously be produced in lightweight construction.

According to another preferred development of the structural element, the expansion joint is arranged in a transverse direction and/or in a vertical direction and/or in a longitudinal direction of the structural element. As a result, it is possible to produce the expansion joint with any three-dimensional geometry, whereby the field of application of the structural element is extended.

According to a preferred development of the method, the structural element is provided with a cover layer which surrounds the core at least in portions, in particular a cover layer formed using carbon fibres. The cover layer advantageously makes it possible to achieve a high level of rigidity and the desired mechanical properties of the structural element. The applied cover layer also advantageously allows loads to be introduced into the structural element.

According to another preferred development of the method, the expansion joint is inserted in a liquid state between the core regions. This makes it possible to produce a particularly thin expansion joint having virtually any geometry.

According to another preferred development of the method, the expansion joint is inserted in a solid or paste-like state between the core regions, whereby it is advantageously possible to use prefabricated semi-finished products, for example foils, to produce the expansion joint. As a result, the costs of applying the method can be reduced.

BRIEF DESCRIPTION OF THE DRAWINGS

The invention will be explained in further detail by way of embodiments with reference to the accompanying figures of the drawings, in which.

In the figures, like reference numerals refer to like or functionally like components unless information to the contrary is given.

DETAILED DESCRIPTION

Figure 1:
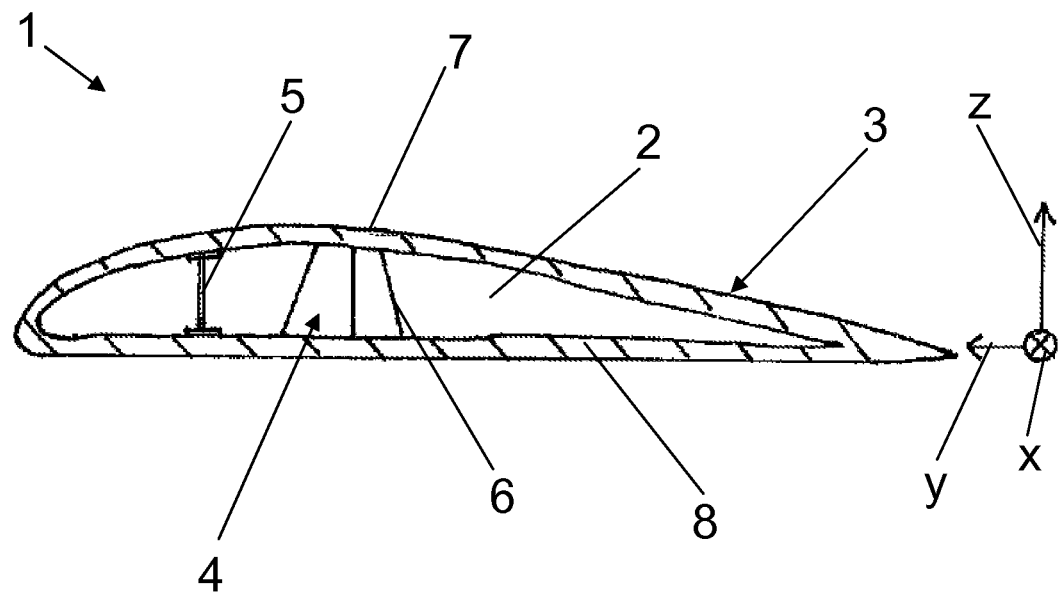
FIG. 1 is a sectional view of a preferred embodiment of a structural element.

FIG. 1 is a cross-sectional view of a preferred embodiment of a structural element 1 for an aircraft and spacecraft. The structural element 1 is for example formed as a shell 1 of a rudder unit or a box structure, as a control surface 1, as a fuselage segment 1, as an aerofoil 1 or as any other component of the aircraft and spacecraft.

The structural element 1 preferably has a sandwich structure comprising a core 2 and a cover layer 3 surrounding the core 2 at least in portions. The cover layer 3 is for example formed using a plastics material reinforced with carbon fibres, aramid fibres, glass fibres and/or any desired fibres. The cover layer 3 is preferably connected, in particular bonded, to the core 2. For example, the cover layer 3 is placed on the core 2 as a dry fibre woven fabric and/or fibre non-woven fabric and infiltrated with matrix material in an appropriate mould. For example, a so-called resin infusion method is used as a method. The core 2 preferably comprises a foam material. For example, a plastics material foam and/or a metal foam is used as a foam material. The core 2 may have a uniform or variable density. Density is understood to mean the mass per unit volume of the core 2. For example, the core 2 may have different regions or segments having different densities. As an alternative or in addition to the foam material, the core 2 may comprise a solid material, for example wood. The core 2 preferably comprises an integrated reinforcement 4. The integrated reinforcement 4 is for example formed using a fibre-reinforced plastics material, in particular using a carbon-fibre-reinforced plastics material. The integrated reinforcement 4 comprises for example a reinforcement profile 5 and/or a reinforcement pin 6. The integrated reinforcement 4 preferably comprises a plurality of reinforcement profiles 5 and/or reinforcement pins 6. In particular, alternatively or in addition, reinforcement needles may also be provided, for example in lieu of reinforcing pins 6.

The integrated reinforcement 4 may extend as desired for example in the transverse direction x, in the longitudinal direction y and/or in the vertical direction z of the core 2. FIG. 1 shows for example a reinforcement profile 5 extending in the transverse direction x of the structural element and having an I-shaped cross-section. The integrated reinforcement 4 is used for example to vary, in portions, the rigidity of the core 2. The integrated reinforcement 4 preferably couples together opposing cover skins 7, 8 of the cover layer 3. In particular, the integrated reinforcement 4 and the cover layer 3 are formed monolithically. For example, flange portions of the reinforcement profile 5 are monolithically connected to the cover skins 7, 8, a web portion of the reinforcement profile 5 coupling together the cover skins 7, 8. The reinforcement profile 5 may for example have an I-, T- or C-shaped cross-section. The reinforcement profile 5 allows a linear reinforcement of the core 2, whereas the reinforcement pins 6 allow a planar reinforcement of the core 2. The reinforcement pins 6 and/or the reinforcement profile 5 are for example inserted into corresponding recesses of the core 2 and/or placed between core segments of the core 2. The reinforcement pins 6 may be orientated as desired in the transverse direction x, longitudinal direction y and vertical direction z of the structural element 1 and of the core 2.

Figure 2:
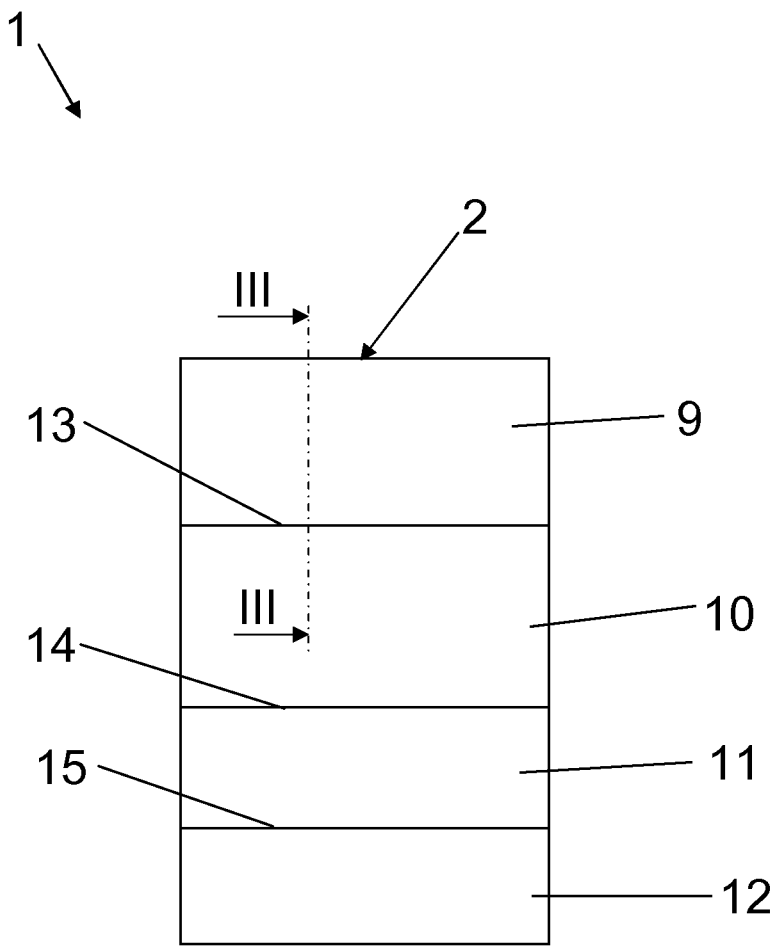
FIG. 2 is a plan view of a preferred embodiment of the structural element according to FIG. 1.

FIG. 2 is a plan view of a preferred embodiment of a structural element 1 according to FIG. 1, the cover layer 3 being omitted to give a better view of the core 2 of the structural element 1. The core 2 preferably comprises a plurality of core regions 9-12. The core regions 9-12 are for example formed as core strips or core segments 9-12 which are separated from one another. The number of core regions 9-12 is arbitrary. The core 2 preferably comprises at least two core regions 9-12. For example, the core regions 9-12 of the core 2 subdivide the core 2 in the transverse direction x into core strips 9-12 extending over the longitudinal direction y of the core 2. The core strips 9-12 may for example have identical widths or different widths.

An expansion joint 13-15 is preferably arranged between two adjacent core strips 9-12 in each case. The number of expansion joints 13-15 is arbitrary and depends substantially on the number of core strips 9-12. Preferably at least one expansion joint 13-15 is provided. The expansion joints 13-15 preferably comprise a silicone material or a rubber-like, flexible, resilient and/or compressible material. The expansion joints 13-15 are preferably connected, for example bonded, to the core strips 9-12, the connection between the expansion joints 12-15 and the core strips 9-12 in particular not being implemented in the form of a structural connection, such as a structural bond, but rather preferably serving merely to facilitate handling of the core strips 9-12 and the expansion joints 13-15. The core strips 9-12, together with the corresponding expansion joints 13-15, preferably form the core 2 in the form of a so-called composite core strip packet 2, which for example is inserted as a preformed semi-finished product in a production process of the structural element 1. Alternatively, the core strips 9-12 are not connected or bonded to the corresponding expansion joints 13-15.

In a production process of the structural element 1 the expansion joints 13-15 are for example sprayed on or between the corresponding core strips 9-12 or cast between the core strips 9-12 in the form of a liquid or paste-like raw material or placed or inserted between the corresponding core strips 9-12 in the form of a solid material as a plate, foil or film. For example, the expansion joints 13-15 each have a thickness of from a few tenths of a millimeter to a few millimeters, for example a thickness of 1.5 millimeters. The expansion joints 13-15 may be connected, in particular bonded, to the cover layer 3, preferably no forces being transmitted between the expansion joints 13-15 and the cover layer 3. Alternatively there is no connection between the cover layer 3 and the expansion joints 13-15. The expansion joints 13-15 are arranged as desired in the transverse direction x, in the vertical direction z and/or in the longitudinal direction y of the structural element 1 and may for example have any curved or three-dimensional geometry.

The expansion joints 13-15 uncouple the core strips 9-12 from one another. A mechanical uncoupling preferably takes place in such a way that stresses, for example thermally induced tensile stresses, occurring in a core region 9-12 are not transmitted to the further core regions 9-12. The expansion joints 13-15 allow for example an expansion of the core strips 9-12 in the width direction x of the structural element 1. The expansion joints 13-15 act in particular as crack arrestors. For example, local damage to a core strip 9-12, for example owing to stone impact, is limited to the damaged core strip 9-12 by means of the expansion joints 12-15. In the case of existing damage to a core strip 9-12, for example a crack, the expansion joints 13-15 also prevent this damage from spreading to further core regions 9-12. In particular, time-driven crack growth within the core 2 is inhibited by means of the expansion joints 13-15.

Figure 3:
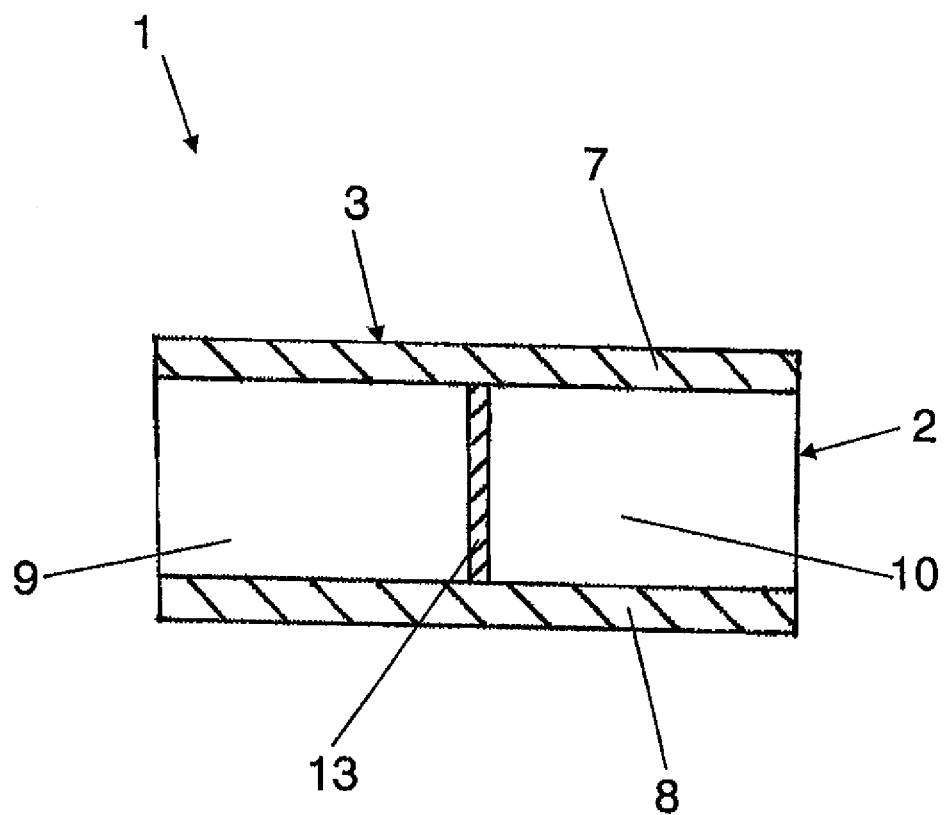
FIG. 3 is a partial sectional view of a preferred development of the structural element along the line of FIG. 2.
Figure 3:
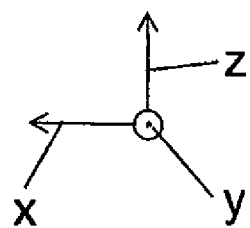

FIG. 3 is a partial cross-sectional view of the structural element 1 along the line of FIG. 2. According to a preferred embodiment of the structural element 1, the expansion joint 13 is arranged between the core-strips 9, 10 of the core 2 in a vertical direction between the cover skins 7, 8 of the cover layer 3, in other words in the z direction of the structural element 1.

Figure 4:
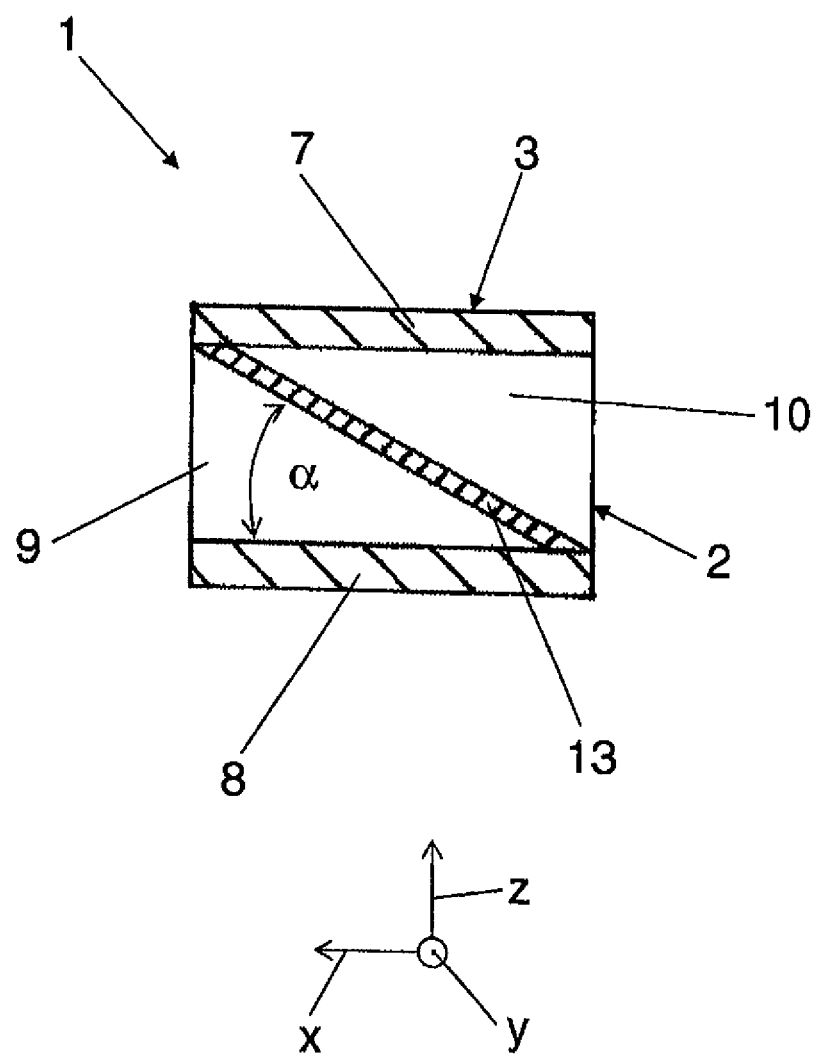
FIG. 4 is a partial sectional view of another preferred development of the structural element along the line of FIG. 2.

FIG. 4 shows a further preferred arrangement of the expansion joint 13 in a partial cross-sectional view of the structural element 1, likewise along the line III-III of FIG. 2. The expansion joint 13 is arranged obliquely between the core strips 9, 10 of the core 2 of the structural element 1, in other words the expansion joint 13 extends in the transverse direction x and in the vertical direction z of the structural element 1 obliquely between the cover skins 7, 8 of the cover layer 3. An angle of inclination a, for example between the cover skin 8 and the expansion joint 13, may be selected as desired.

Figure 5:
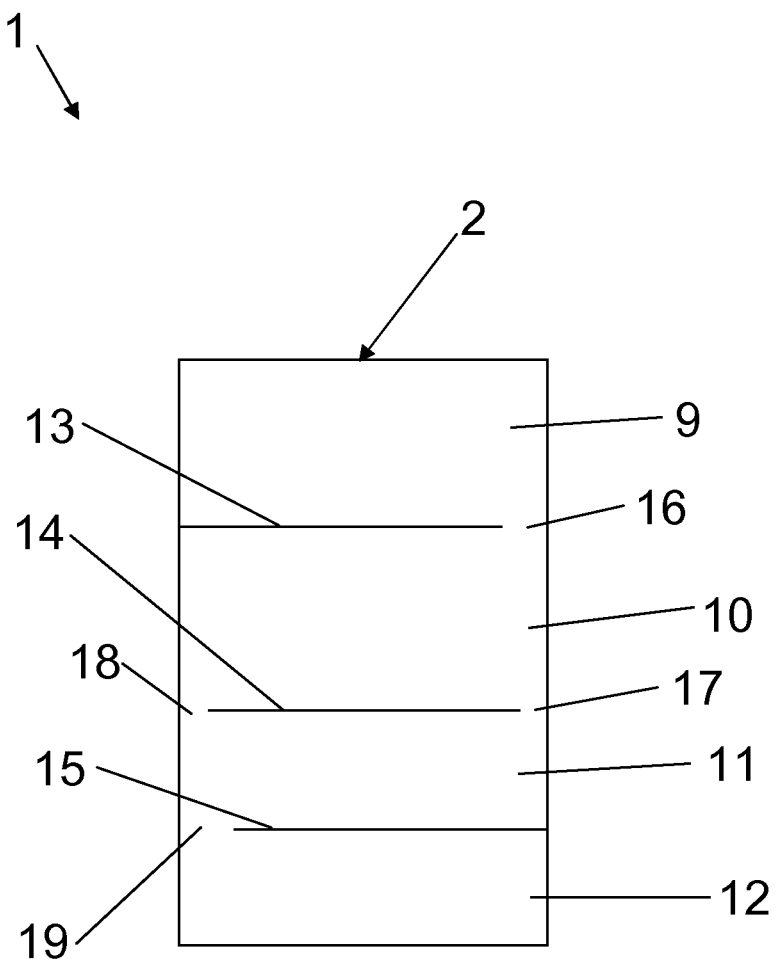
FIG. 5 is a plan view of another preferred embodiment of the structural element according to FIG. 1.
Figure 5:
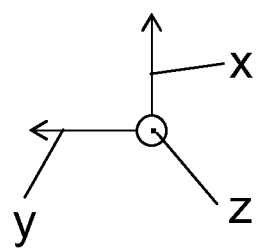

FIG. 5 is a plan view of the structural element 1 according to FIGS. 1 to 4 comprising a development of the core 2, the cover layer 3 being omitted for simplification. This configuration of the structural element 1 differs from the embodiment of the structural element 1 according to FIGS. 1 to 4 merely in that the core regions 9-12 are not formed separately from one another, but rather are interconnected by means of material bridges 16 to 19. For example, core region 9 is connected to core region 10 by means of a material bridge 16, core region 10 is connected to core region 11 by means of material bridges 17, 18, and core region 11 is connected to core region 12 by means of a material bridge 19. The number of material bridges 16-19 which interconnect the respective core regions 9-12 is arbitrary. For example, the expansion joints 13-15 may be interrupted by material bridges (not shown). To produce the structural element 1, the core 2 is for example formed, in particular milled, from a foam semi-finished product, recesses being provided in the core 2 for the expansion joints 13-15 and the material bridges 9-16 representing non-worked regions of the foam semi-finished product during production of the recesses. The expansion joints 13-15 are inserted, injected, cast or the like into the recesses between the core regions 9-12. The material bridges 16-19 are preferably formed in such a way that they do not influence the above-described function of the expansion joints 13-15. This is achieved for example by a sufficiently low material thickness of the material bridges 16-19.

Figure 6:
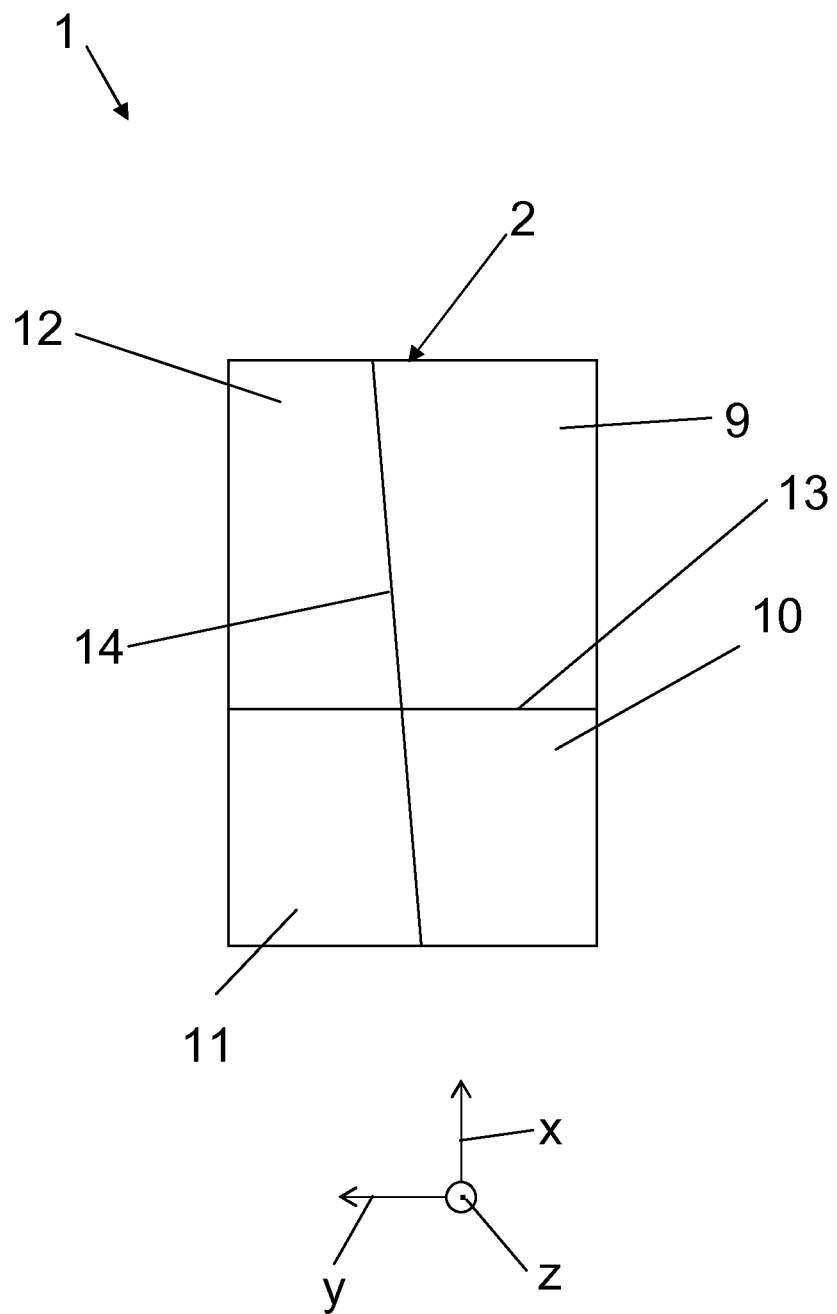
FIG. 6 is a plan view of yet another preferred embodiment of the structural element according to FIG. 1.

FIG. 6 is a plan view of the structural element 1 according to FIGS. 1 to 4 comprising another development of the core 2, the cover layer 3 being omitted for simplification. This embodiment of the structural element 1 differs from the embodiment of the structural element 1 according to FIGS. 1 to 4 merely in that the core regions 9-12 are formed as core segments 9-12 which subdivide the core 2 as desired in the transverse direction x and in the longitudinal direction y. The core segments 9-12 preferably subdivide the core 2 in the form of a matrix, expansion joints 13 and 14 being arranged between the core segments 9-12. For example, the expansion joints 13, 14 intersect. The expansion joints 13, 14 allow for example an expansion of the core segments 9-12 in the width direction x and/or in the longitudinal direction y of the structural element 1, in other words in the planar direction of the structural element 1.

Figure 7:
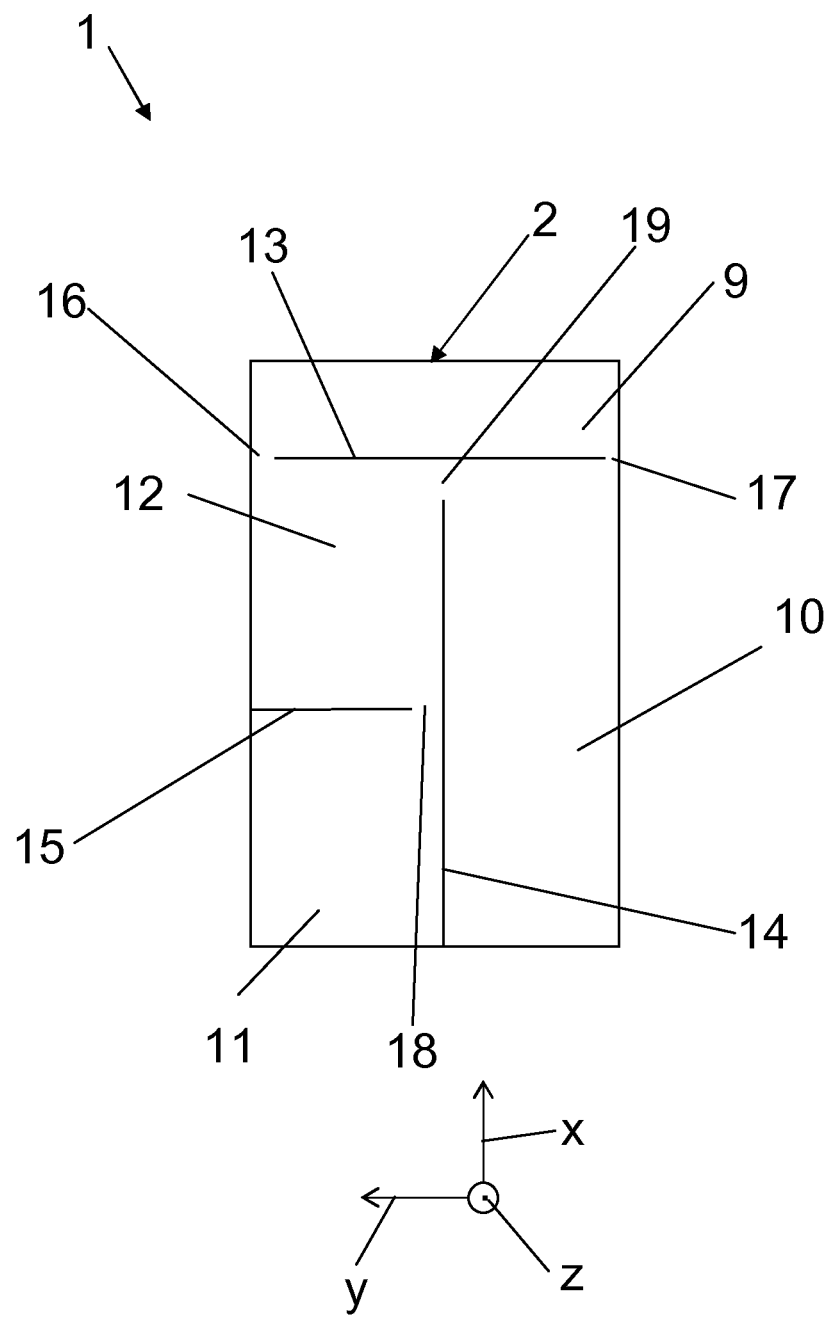
FIG. 7 is a plan view of yet another preferred embodiment of the structural element according to FIG. 1.

FIG. 7 is a plan view of the structural element 1 according to FIGS. 1 to 4 comprising another development of the core 2, the cover layer 3 being omitted for simplification. This embodiment of the structural element 1 differs from the embodiment of the structural element 1 according to FIGS. 1 to 4 merely in that the core regions 9-12 subdivide the core 2 as desired in the transverse direction x and in the longitudinal direction y, the core regions 9-12 being interconnected by means of material bridges 16-19 according to the embodiment of the structural element 1 according to FIG. 5. The core regions 9-12 preferably subdivide the core 2 in the form of a matrix, expansion joints 13-15 being arranged between the core segments 9-12. The expansion joints 13-15 preferably do not intersect. The expansion joints 13-15 allow for example an expansion of the core regions 9-12 in the width direction x and/or in the longitudinal direction y of the structural element 1.

Figure 8:
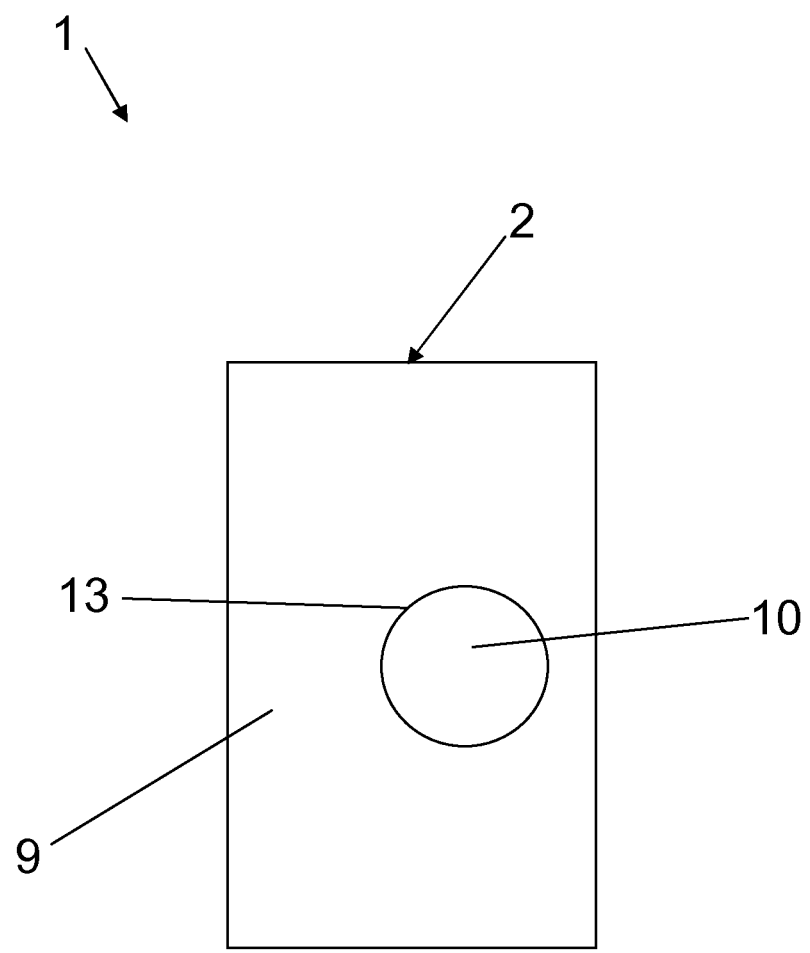
FIG. 8 is a plan view of yet another preferred embodiment of the structural element according to FIG. 1.

FIG. 8 is a plan view of the structural element 1 according to FIGS. 1 to 4 comprising yet another development of the core 2, the cover layer 3 being omitted for simplification. This embodiment of the structural element 1 differs from the embodiment of the structural element 1 according to FIGS. 1 to 4 merely in that a second core region 10 in the form of a block is received by a first core region 9. The core regions 9, 10 are preferably formed as core segments 9, 10 which are formed separately from one another, a sealing joint 13 being arranged between the core segments 9, 10. The sealing joint 13 preferably surrounds the core segment 10. The core segment 10 can have any shape, for example a cylindrical shape. The core segment 9 preferably comprises a recess which is complementary to the core segment 10. The core segment 9 may comprise further recesses for additional core segments (not shown). For example, the core segment 10 is used to introduce a load into the core 2 and into the structural element 1. For example, stresses, in particular tensile stresses, occurring in the core segment 10 are uncoupled from the core segment 9 by means of the expansion joint 13. For example, an incipient crack present in the core segment 10 may be stopped by means of the expansion joint 13. The expansion joint 13 also allows an expansion, in particular a thermal expansion, of the core segment 10. The expansion joint 13 allows in particular an expansion of the core segment 10 in the width direction x and/or in the longitudinal direction y of the structural element 1.

Figure 9:
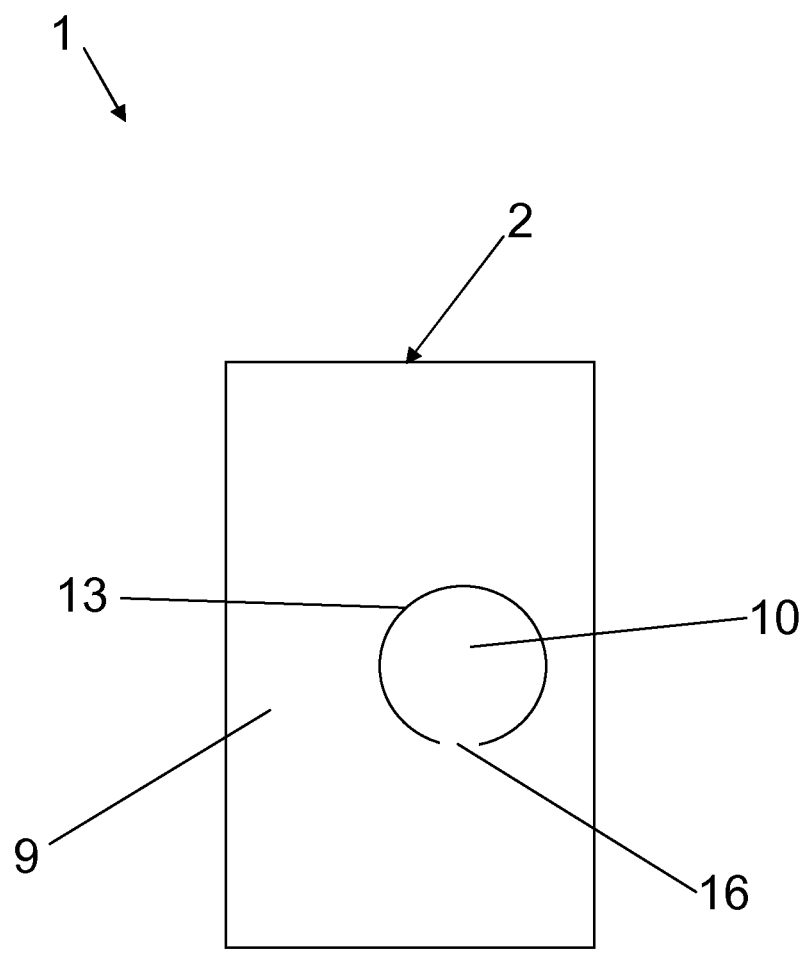
FIG. 9 is a plan view of yet another preferred embodiment of the structural element according to FIG. 1.
Figure 9:
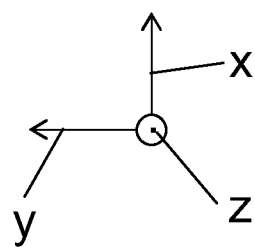

FIG. 9 shows a development of the structural element 1 according to FIG. 8. The structural element 1 according to FIG. 9 differs from the embodiment of the structural element 1 according to FIG. 8 merely in that the core regions 9, 10 of the core 2 are interconnected by means of a material bridge 16 according to the embodiments of the structural element 1 according to FIGS. 5 and 7.

Figure 10:
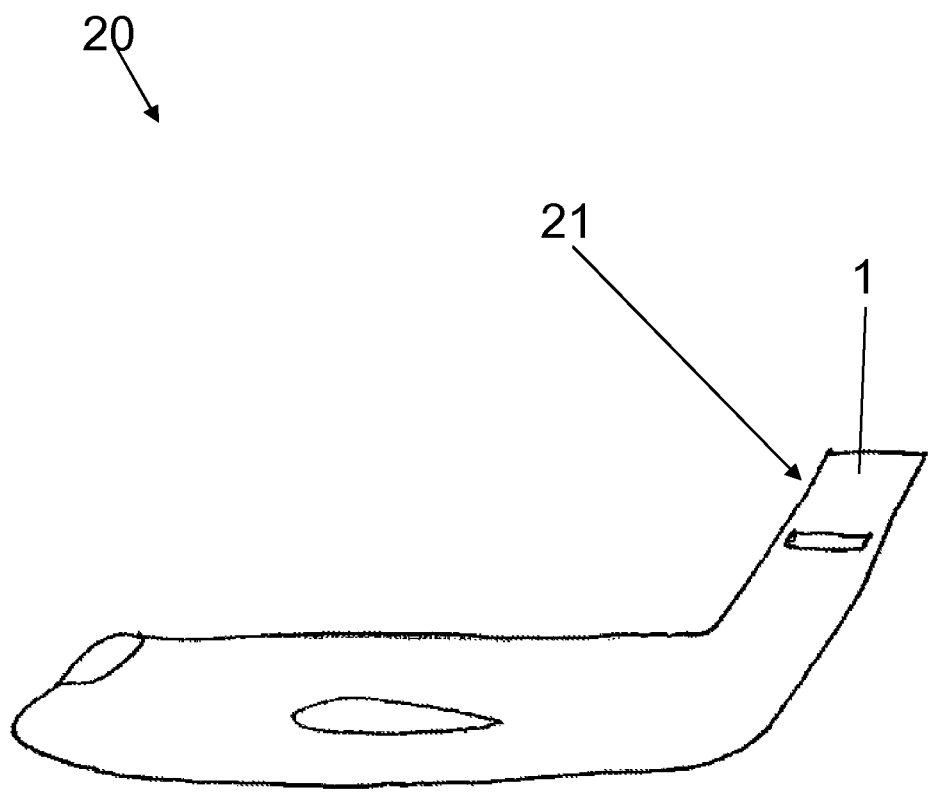
FIG. 10 shows a preferred configuration of an aircraft and spacecraft comprising a structural element according to FIGS. 1 to 9.

FIG. 10 shows a preferred embodiment of an aircraft and spacecraft 20 comprising a tail unit 21, in particular a rudder unit 21. The tail unit 21 is for example formed as a structural element 1 or comprises a structural element 1 or a plurality of structural elements 1 according to the embodiments of the structural element 1 according to FIGS. 1 to 9.

A method for producing a structural element 1 for an aircraft and spacecraft 20 comprises for example the following method steps. First a core 2 of the structural element 1 is provided, which core comprises core regions 9-12. The core regions 9-12 are uncoupled from one another by means of expansion joints 13-15 arranged between the core regions 9-12. The structural element 1 is optionally provided for example with a cover layer 3 which surrounds the core 2 at least in portions, in particular with a cover layer 3 formed using carbon fibres.

Although the present invention has been described in full with reference to preferred embodiments, it is not restricted thereto, but can be modified in many different ways. In particular, features of the individual embodiments listed above can be combined together as desired, if this makes technical sense.

The materials, numbers and dimensions given are to be understood as examples and serve merely to explain the embodiments and developments of the present invention.

Use of the invention in other fields, in particular in vehicle construction or shipbuilding, is of course also conceivable.

What is claimed is:

1. A structural element for an aircraft and spacecraft, the structural element comprising:

a core having core regions which are uncoupled from one another by an expansion joint arranged between the core regions;

wherein the expansion joint comprises a silicone material or a rubber-like material such that the expansion joint is adapted to mechanically uncouple the core regions from one another such that stresses occurring in a core region are not transmitted to further core regions.

2. The structural element according to claim 1, wherein the expansion joint is formed in such a way that propagation of damage present in a corresponding core region to further core regions is inhibited by the expansion joint.

3. The structural element according to claim 1, wherein the structural element has a sandwich structure comprising a cover layer which surrounds the core at least in portions, in particular a cover layer comprising carbon fibres.

4. The structural element according to claim 3, wherein the expansion joint is connected, in particular bonded, to the cover layer.

5. The structural element according to claim 3, wherein the core comprises an integrated reinforcement.

6. The structural element according to claim 5, wherein the integrated reinforcement couples together opposing cover skins of the cover layer of the structural element, the integrated reinforcement and the cover layer being formed in particular monolithically.

7. The structural element according to claim 5, wherein the integrated reinforcement comprises a plurality of reinforcement pins and/or reinforcement profiles.

8. The structural element according to claim 1, wherein the core comprises a foam material.

9. The structural element according to claim 1, wherein the expansion joint is arranged in a longitudinal direction and in a vertical direction of the structural element or in a transverse direction and in a vertical direction of the structural element or at least partially in a transverse direction and at least partially in a longitudinal direction and in a vertical direction of the structural element.

10. A method for producing a structural element for an aircraft and spacecraft, the method comprising:

providing a core of the structural element, which core comprises core regions; and arranging an expansion joint between the core regions in order to uncouple the core regions from one another;

wherein the expansion joint comprises a silicone material or a rubber-like material such that the expansion joint uncouples the core regions from one another such that stresses occurring in a core region are not transmitted to the further core regions.

11. The method according to claim 10, wherein the method comprises providing the structural element with a cover layer which surrounds the core at least in portions, in particular a cover layer comprising carbon fibres.

12. The method according to claim 10, wherein the method comprises inserting the expansion joint in a liquid state between the core regions.

13. The method according to claim 10, wherein the method comprises inserting the expansion joint in a solid or paste-like state between the core regions.

14. An aircraft and/or spacecraft comprising a structural element according to claim 1.

15. The structural element according to claim 1, wherein the expansion joint is formed such that damage occurring in a corresponding core region is limited to the corresponding core region by the expansion joint.

* * * * *